(12) United States Patent
Herbert et al.

(10) Patent No.: US 10,869,187 B1
(45) Date of Patent: Dec. 15, 2020

(54) SYSTEM AND METHOD FOR GENERATING CONSUMER MOBILITY PROFILE

(71) Applicant: STATE FARM MUTUAL AUTOMOBILE INSURANCE COMPANY, Bloomington, IL (US)

(72) Inventors: Cameron John Herbert, Bloomington, IL (US); Kristopher Keith Gaudin, Bloomington, IL (US); Connor Warren McCloskey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/534,731

(22) Filed: Aug. 7, 2019

Related U.S. Application Data

(60) Provisional application No. 62/715,549, filed on Aug. 7, 2018.

(51) Int. Cl.
*H04W 8/08* (2009.01)
*G06Q 40/08* (2012.01)
*H04W 4/029* (2018.01)

(52) U.S. Cl.
CPC .............. *H04W 8/08* (2013.01); *G06Q 40/08* (2013.01); *H04W 4/029* (2018.02)

(58) Field of Classification Search
CPC ......... H04W 8/08; H04W 8/18; H04W 8/082; H04W 8/183; H04W 8/186; H04W 8/20; H04W 8/205; H04W 8/22; H04W 8/24; H04W 8/245; H04W 8/26; H04W 88/02; H04W 88/00; H04W 40/20; H04W 40/24; H04W 40/242; H04W 4/02; H04W 4/00; H04W 4/024; H04W 4/023; H04W 4/026; H04W 4/029; H04W 12/00503; H04W 12/1004; H04W 64/00; H04W 64/003; H04W 68/00; H04W 8/02; H04W 4/021; H04W 4/50; H04W 4/60; H04W 4/70; H04W 12/10; H04W 12/1002; H04W 52/28; H04W 52/285; H04W 16/22;
(Continued)

(56) References Cited

U.S. PATENT DOCUMENTS 10,373,494 B1 * 8/2019 Krysiuk ................. G08G 1/144
10,389,828 B2 * 8/2019 Andrade et al. ........ H04L 67/22
(Continued)

*Primary Examiner* — Meless N Zewdu
(74) *Attorney, Agent, or Firm* — Marshall, Gerstein & Borun LLP

(57) ABSTRACT

A method of generating a user mobility profile includes receiving mobility data associated with the user, storing the mobility data associated with the user in an electronic database, generating a mapping wherein the generated mapping is configured to analyze a portion of the mobility data and the generated mapping is configured to produce an output corresponding to the portion of the mobility data, analyzing one or more portions of the mobility data using the mapping to produce an output corresponding to the one or more portions of the mobility data, generating information corresponding to the user based on the output corresponding to the one or more portions of the mobility data, transmitting the information corresponding to the user to a display device, and displaying the information corresponding to the user in a the display device.

20 Claims, 7 Drawing Sheets

(58) Field of Classification Search
CPC ......... H04W 16/28; H04W 4/23; H04W 4/30;
G06Q 40/08; G06Q 40/00; G06Q 40/02;
G06Q 40/025; G06Q 40/04; G06Q 40/06;
G06Q 10/00; G06Q 10/02; G06Q
10/06312; G06Q 10/06315; G06Q
10/0635; G06Q 20/40; G06Q 30/00;
G06Q 30/01; G06Q 30/02; G06Q
30/0201; G06Q 30/0205; G06Q 30/0217;
G06Q 30/0222; G06Q 30/0281; G06Q
20/32; G06Q 20/322; G06Q 20/3221;
G06Q 20/3224; G06Q 20/3227; G06Q
30/0267; G06Q 30/0269; G06Q 30/0266;
G06N 20/00; G06N 20/20
See application file for complete search history.

(56) References Cited

U.S. PATENT DOCUMENTS

| | | | | |
|---|---|---|---|---|
| 10,609,616 | B2* | 3/2020 | Alfred et al. | H04W 36/32 |
| 2005/0097161 | A1* | 5/2005 | Chiou et al. | 709/200 |
| 2007/0072605 | A1* | 3/2007 | Poczo | 455/432.2 |
| 2011/0153553 | A1* | 6/2011 | Klotz | 707/607 |
| 2013/0173450 | A1* | 7/2013 | Celka et al. | G06Q 40/025 |
| 2013/0324074 | A1* | 12/2013 | Way | H04W 4/02 |
| 2016/0163174 | A1* | 6/2016 | Zhang | G08B 21/0453 |
| 2017/0213273 | A1* | 7/2017 | Dietrich et al. | G06Q 30/0631 |
| 2017/0370736 | A1* | 12/2017 | Singh | G01C 21/3415 |
| 2019/0394655 | A1* | 12/2019 | Rahman et al. | H04W 24/02 |

* cited by examiner

SYSTEM AND METHOD FOR GENERATING CONSUMER MOBILITY PROFILE

CROSS-REFERENCE TO RELATED APPLICATION

The present application claims priority to U.S. Application No. 62/715,549, filed Aug. 7, 2018. The priority application is hereby incorporated by reference.

TECHNICAL FIELD

The present invention generally relates to systems and methods for generating consumer mobility profiles, in particular, for training and/or creating mobility profiles with respect to users.

BACKGROUND

Consumers have been reluctant, historically, to share large amounts of data with companies, even for the purpose of receiving enhanced service. The type of data users have been willing to share has varied over time, and generally, users' hesitance to share personal information and location/movement data has remained constant. The historical lack of quality user data has blunted the effectiveness of campaigns intended to appeal to prospective customers looking for a more connected and personalized banking and insurance experience. However, new research has shown that younger users are appreciably more willing to share all types of data with companies, particularly in exchange for improved and/or personalized service.

User data collected may create a better understanding of each consumer, including by allowing multiple users to be distinguished in a way that may not be possible with traditional data collection practices, where only limited information may be known about each respective user. Newfound user willingness, combined with the application of data modeling algorithms across and among many categories of user data, may provide companies with unprecedented insights into their users' behaviors, preferences, and the risks attendant to those customers. By having a deeper understanding of user behavior, it may be possible for companies to offer rewards to customers who act to decrease risks. Therefore, there is a need for methods and systems for generating user mobility profiles, to provide a more personalized experience to users and to allow service providers to apply findings from the data for the benefit of the user by dynamically learning a user's preferences and opportunities to reduce risk, along with individual user information to help the user navigate life more effectively, efficiently, and intuitively.

BRIEF SUMMARY

In one aspect, a method for generating a consumer mobility profile includes receiving mobility data associated with the user, storing the mobility data associated with the user in an electronic database, and generating a mapping wherein the generated mapping is configured to analyze a portion of the mobility data, and wherein the generated mapping is configured to produce an output corresponding to the portion of the mobility data. The method may also include analyzing one or more portions of the mobility data using the generated mapping to produce an output corresponding to the one or more portions of the mobility data, and generating information corresponding to the user based on the output corresponding to the one or more portions of the mobility data. The method may further include transmitting the generated information corresponding to the user to a display device, wherein the display device includes one or both of (i) the remote computing device, and (ii) a device of the user, as well as displaying the generated information corresponding to the user in the display device.

In another aspect a computing system including one or more processors and one or more memories storing instructions is provided. When the instructions are executed by the one or more processors, they cause the computing system to receive mobility data associated with the user in a remote computing device, store the mobility data associated with the user in an electronic database, and generate a mapping, wherein the generated mapping is configured to analyze a portion of the mobility data and wherein the generated mapping is configured to produce an output corresponding to the portion of the mobility data. The instructions may further cause the computing system to analyze one or more portions of the mobility data to produce an output corresponding to the one or more portions of the mobility data using the generated mapping, and to generate information corresponding to the user based on the output corresponding to the one or more portion of the mobility data. The instructions may further cause the computing system to transmit the information corresponding to the user to a display device, wherein the display device includes one or both of (i) the remote computing device, and (ii) a device of the user; and to display the generated information corresponding to the user in the display device.

BRIEF DESCRIPTION OF THE FIGURES

The figures described below depict various aspects of the system and methods disclosed herein. It should be understood that each figure depicts an embodiment of a particular aspect of the disclosed system and methods, and that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
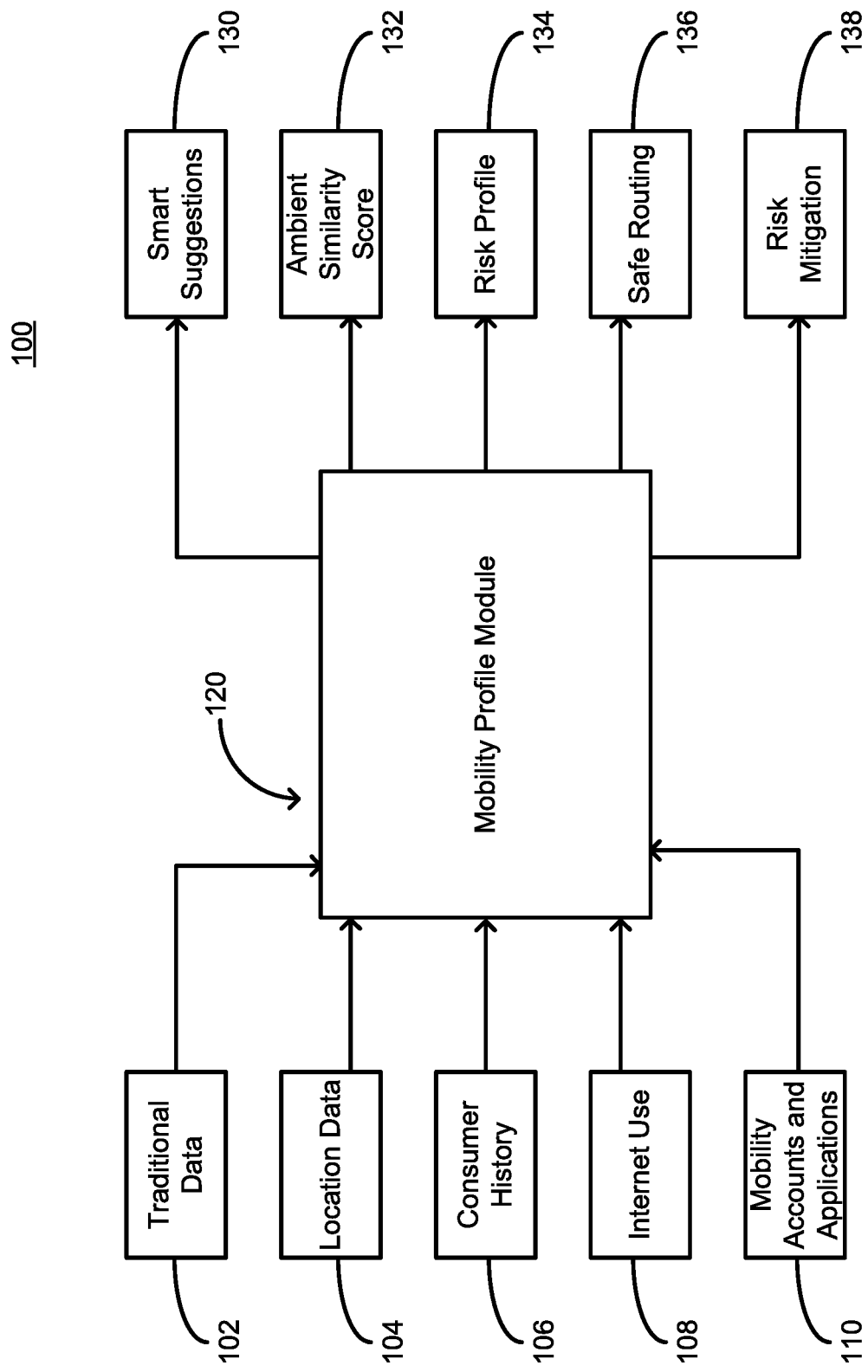
FIG. 1 depicts an example flow diagram for using a mobility profile to generate mobility profile outputs, based on mobility data, according to an embodiment.

The embodiments described herein relate to, inter alia, methods and systems for generating one or more mobility profiles by training neural network models to generate suggestions for users. The methods and systems may provide value and lead to more valuable interactions with users, provide beneficial recommendations about matters in life users care about, and provide insight into the lives of users to provide more exclusive and personalized products and services. The methods and systems may allow the users' expectations to be exceeded, and allow a better understanding of the customer, which may be used to create new risk profiles for the provision of improved risk assessment. Risk profiles may offer a deeper understanding of individual risks faced by each user, as well as opportunities to personalize products and services. Data sharing may provide new commercial opportunities on an opt-in basis. By helping a user to manage their day, mobility profiles may help users manage the risks of each day.

In an embodiment, a mobility profile may relate to a set of inputs and outputs. For example, a mobility profile neural network model may be constructed that uses various categories of mobility data that a user has approved of, on an opt-in basis, to generate a series of beneficial outputs. For example, a mobility profile may receive as input traditional data and non-traditional data. Traditional data may include demographics data, department of motor vehicle (DMV) data, a credit reporting data (e.g., a credit score), etc. Non-traditional data may include location data, consumer history data, internet use data, and other sources and types of data. A mobility profile may receive as input location and movement data. Location data may include motion data from a gyroscope in a mobile device (e.g., a cellular phone), and global positioning system (GPS) data. GPS data may provide insight into the way a user spends their time, including activities that are primarily active (e.g., running, shopping, or driving) and/or those that are primarily stationary (e.g., attending a baseball game). A mobility profile may receive as input consumer history data. Consumer history data may include an indication of the products and services the consumer has purchased over time. Consumer purchase history may provide an indication of the types of items the user finds valuable, as well as the type of companies that the user appreciates. A mobility profile may receive as input the user's internet use, including websites (e.g., URLs) visited by the user and data and connections (e.g., identity/friendship information) of social media sites. A mobility profile may receive as input mobility accounts and applications. Mobility accounts and applications may include ride sharing profiles (e.g., Lyft or Uber) as well as data from other user mobile device applications.

As noted above, a mobility profile may produce a number of beneficial outputs. For example, a first benefit of a mobility profile may be the ability to utilize machine learning and data analysis techniques to produce smart suggestions for a user. Using the mobility profile input data, mobility profile may make a broad range of suggestions tailored to the individual user. For example, the methods and systems may recommend a new restaurant to the user based on the user's purchases at a grocery store. The methods and systems may recommend live events (e.g., a concert) based on the user's music listening and/or purchasing habits. A second beneficial output of the methods and systems may be a similarity score. Mobility profiles may be analyzed to create a network of data and connections between similar and/or related profiles. Similar or related profiles may receive recommendations from other profiles. For example, the mobility profiles of two users, user A and user B, may be analyzed. In a conversation (e.g., as in a series of SMS messages between user A and user B), user A may recommend a website to user B. User B may visit the website, and the methods and systems may analyze user B's web traffic history to determine whether user B has ever visited the site previously. The methods and systems may also analyze user B's subsequent history to determine whether user B subsequently visits the website, and if so, the frequency and duration of such visits. Then, the methods and systems may simulate conversations between other users that are similar to user B, to determine whether the website is a relevant suggestion to the other users. The number of visits user B makes to the website may be used to determine relevance. If the website is determined of potential relevance to other users, then the methods and systems may suggest the website to other users whose respective mobility profiles are similar to that of user B, based on the similarity score. A third beneficial output may be a risk profile, one of which may be associated with each respective mobility profile. For example, the risks faced by a user may be quantified by the methods and systems herein. A fourth beneficial output may be transportation support based on calendar activities, trends, and location. A fifth beneficial output of a user mobility profile may be mitigation of risk. A user may be provided with access to their mobility profile, therefore making the user aware of the risks faced, and encouraging the user to adopt a healthy and responsible lifestyle.

With respect to FIG. 1, an example data flow environment 100 for using a data processing system, including a neural network module to accept inputs and produce outputs, is depicted. Environment 100 may include data inputs, such as traditional data 102, location data 104, consumer history 106, internet use 108, and mobility accounts and applications 110. Environment 100 may include mobility profile module 120, which relates to the data inputs. Environment 100 may include data outputs, such as smart suggestions 130, ambient similarity score 132, risk profile 134, safe routing 136, and risk mitigation 138.

Traditional data 102 may include data that the proprietor of environment 100 may possess or have access to before the environment 100 is used, such as data a user supplied to the proprietor during a prior interaction (e.g., while applying for an insurance policy or other product or service). Traditional data 102 may have been collected by a computerized process, or manually such as via a telephone operator or in a paper application later scanned into an electronic records system. Traditional data 102 may also be obtained from a third party service, or a subsidiary or parent company. Traditional data 102 may include data which users have historically been willing to share with service providers. Location data 104 may include data pertaining to the location, orientation, rotation, and/or acceleration of a given user (e.g., readings from a gyroscope, accelerometer, GPS module, etc.). Consumer history 106 may include data pertaining to a user's interaction with businesses of any kind. For example, a user's credit history may be included in consumer history 106. Another source of accounts the user has established may be associated with the consumer history 106. Consumer history 106 may include purchase history (e.g., a user's grocery purchases, credit card billing statement, etc.).

Each of the respective inputs (e.g., location data 102) and respective outputs (e.g., smart suggestions 130) depicted in environment 100 may be associated with a respective given user or household. However, each input may be available to mobility profile module 120 on a respective opt-in basis. The mobility profile embodied by mobility profile module 120 may be in different stages of completion, depending upon the number of inputs that are collected, of an available total, and a value indicating whether one or more inputs is, or is not, present may be available for querying by other entities.

Internet use 108 may be a list of web sites (e.g., URLs) the user has visited, and may be provided by the user directly (e.g., by exporting browsing history from a web browser) or passively, such as by an application executing in a device of the user, or a proxy server situated between the user and the Internet, which tracks pages visited. Internet use 108 may include respective internet use metadata in addition to a list of web sites. For example, internet use 108 metadata may include the number of times a user visits a given web site, the length of time the user spent visiting each web site, the date and time of each visit, and so forth. In some embodiments, the payloads and/or content of requests between the user and web sites may be inspected and/or captured as part of internet use 108. For instance, internet use 108 may include a list of grocery items purchased by a user who shopped in an online grocery store, as identified by inspecting a POST request in a grocery shopping cart application.

Internet use 108 may also, in some embodiments, include information regarding the user's social media profiles. For example, internet use 108 may include a list of accounts the user creates and/or uses on different social media platforms (e.g., Facebook, Twitter, etc.). Internet use 108 may include more than a mere list of a user's social media accounts. In particular, internet use 108 may include information about the user's social media accounts (e.g., posts, network connections (friends/followers), affinities, etc.).

Mobility accounts 110 may include links to the user's ride sharing profiles (e.g., Lyft, Uber, etc.) in addition to other applications installed in the user's mobile device(s). Mobility accounts 110 may include trip information (e.g., the number of trips taken by the user via ride sharing services, the respective distance of such trips, the frequency of trips, etc.). In some embodiments, mobility accounts may include other travel-based applications and services, such as rail travel applications, travel assistants, meal delivery applications, etc. Mobility accounts 110 may distinguish between a user's ride sharing profile used for personal travel, as opposed to business travel. Mobility accounts 110 may include mobility account metadata, which may associate a user's account(s) with information pertaining to free rides, settings, and payment information. In an embodiment, internet use 108 may include the amount of data transferred between the user and respective web sites or locations (e.g., a count of the number of bytes or page impressions).

All of the accepted inputs to mobility profile module 120 may be analyzed (e.g., by mobility profile module 120) to form a deeper understanding of the risk of each individual, as well as personalized opportunities for insurance coverage. Analysis may include data analytics, machine learning, and other techniques. As noted above, any such collection may be performed on an opt-in basis. Opting-in may allow for discounts and higher-quality service to be provided to users.

Mobility profile module 120 may associate mappings with a type of acceptable inputs (e.g., grocery data, or music data) and outputs (e.g., a recommendation, score, or risk profile) and mobility profile module 120 may also include instructions for identifying, parsing, filtering, and/or validating input data (e.g., traditional data 102) to determine a set of acceptable input that can be used with each mapping. Each mapping may differ, based on the type of data input and the requirements of the respective analyses. Mobility profile module 120 may include a data collection device. For example, mobility profile module 120 may include a hardware module that integrates into a vehicle of a user which collects telematics data associated with vehicle operation.

Mobility profile module 120 may be implemented as an application installed in a mobile device of a user, and/or in a wearable device of a user. Mobility profile module 120 may be implemented in a device that is located in a user's home. In an embodiment, mobility profile module 120 may be installed in a remote server configured to interoperate with an application in a user device, via a computer network and in others; mobility profile module 120 may be installed in a client device. That is, the training/creation of mappings in mobility profile 120, and the subsequent use of those mappings, may occur, respectively, in a single device. The single device may be a user device (e.g., a mobile device of a user). In other embodiments, more than one device may be used to, respectively, train/create mappings in mobility profile 120, and use/operate the mappings. Mobility profile module 120 may comprise multiple mappings.

Smart suggestions 130 may be a series of mappings from inputs to outputs, wherein the mappings analyze inputs to form inferences. For example, a mapping may accept a user's grocery shopping history and, based on the items the user purchases most frequently, the mapping may infer the name of a restaurant that the user is likely to enjoy. Another mapping may accept a user's music listening history and, based on the artists the user listens to most frequently, the mapping may infer a list of local concerts. The mappings may be implemented as neural networks or data analytics models that are trained and stored in mobility profile module 120, in an embodiment. In some embodiments, mappings may be trained using the data of other users. The outputs of trained models may be considered smart suggestions 130. Mobility profile module 120 may comprise a separate module responsible for classifying and/or categorizing data from a user, and directing the data to an appropriate mapping.

Ambient similarity score 132 may be created based on analyzing a user's similarity to another user or users. As data related to a user is collected, the data may be compared to that of a plurality of other users, and net similarity calculated based on the user's similarity to each of the respective plurality of other users.

Comparison for the purposes of calculating user similarity may be performed along any suitable axis, and may include multiple factors. For example, the shopping habits of two users, A and B, may be compared. The mean hour of the day, and day of the week during which the two shoppers do their shopping may be compared to form a first sub-score. The respective amounts of money spent may also be compared to form a second sub-score. The set of items purchased by each shopper—whether on a per-visit or in the aggregate—may be compared to form a third sub-score. Finally, each sub-score may be summed or otherwise aggregated, to form a total score. In this way, users may be ranked and sorted with respect to other users. A user may be compared to their peers to determine the most "similar" users within a cohort of users, in terms of shopping habits. Once similar peers are determined, the purchasing habits of the peers may be analyzed to determine whether recommendations may be made. For example, peer B may have discovered a new product, X, that that peer A has not yet become aware of. Peer A may be provided with an advertisement or offer to purchase product X because a similar user is a frequent consumer of product X.

Risk profile 134 may be another output of mappings performed by mobility profile module 120, in an embodiment. Risk profiles are discussed in more detail with respect to FIG. 3. Risk profile 134 is, generally, generated by using mobility profile data to assess risk. Risk may be expressed in terms of an absolute or relative scale. For example, a user may represent a favorable/unfavorable categorization of risk (e.g., "risk" or "no risk"), or a user may be graded according to a probability or percentage of risk. Multiple risks may comprise risk profile 134 with respect to each user, wherein each risk in the multiple risks may be expressed with respect to certain perils (e.g., the risk of a vehicular accident, the risk of a home burglary, etc.). Risk may depend on the habits and mobility profile data of a user, and/or other factors. For example, the type of vehicle a user drives may be a factor in determining risk. A user's purchasing habits may indicate higher or lower risk (e.g., instances of alcohol purchasing may indicate higher risk). Risk may be measured according to a scale, such as exponential or logarithmic scale. For example, the first one or two instances of a particular type of conduct (e.g., a purchase of a particular item) may indicate lower risk, but as more instances of the conduct accumulate, the risk may grow higher very quickly (e.g., exponentially). By continuously analyzing a user's mobility data (e.g., purchasing history) a very accurate risk profile may be created on a day-to-day, or real-time (i.e., up-to-the-second), basis.

The risk rating corresponding to a particular activity or purchase may be determined by training a neural network model using historical claim and purchasing data. For example, a neural network may be trained which accepts claim data and purchasing history as input. The claim data and purchasing history may be correlated in time, such that the neural network learns to predict the likelihood of a claim based on the purchasing history. In this way, a neural network may be able to accurately predict whether changes in a user's purchasing history may be likely to precipitate the filing of a claim (e.g., a claim representing the occurrence of a risk event). A user may be provided with their risk profile 134 so that they are able to view the likelihood of certain harms or perils befalling them, and have the opportunity modify their behavior accordingly. In an embodiment, a user may be notified that their risk profile 134 is indicative of a certain type of peril, and may be given the opportunity to receive a discount or more favorable insurance premium by modifying their risk profile 134 prospectively. In general, a deeper understanding of the user may allow a more granular assessment of risk that is revenue-neutral, but which more fairly allocates risk within a risk pool.

Generally, it should be appreciated that the examples described herein are for illustration purposes only, and are not an exhaustive or complete list of all possible input data that may be collected. For example, in an embodiment, a user may consent to allow the collection of medical data, biometric data, or other personal data. Such data may be subject to more stringent storage, collection, and regulatory requirements under the law. Risk profile 134 may allow the insurance risk of each user to be quantified and compared, and may provide opportunities and rewards to encourage users to adopt healthy, claim-mitigating lifestyles and practices. Such rewards may include favorable insurance policies and loan qualifications for users with low risk ratings.

Safe routing 136 is another potential mapping of user input data to output. Safe routing 136 may include transportation support based on recent calendar activities and trends. For example, a user who travels repeatedly to a location, such as a work or entertainment location, may be prompted to avoid a route, or take an alternate route if the user's usual route is somehow compromised. Specifically, location data 104 may provide a user's location (e.g., via GPS coordinates) over time (e.g., throughout a period of several months). An application executing in mobility profile module 120 may examine the user's location data and may determine that the user travels from the user's home to a bowling league on Tuesday evenings. Even if the user does not travel to the league every Tuesday evening, and only does so 80% of the time, an inference may still be made that the user is likely to travel to the league on the next Tuesday evening. On the next Tuesday afternoon, the application may determine that, based on past travel, the user will travel to the bowling league that evening. The application may further determine information regarding the route the user takes to the bowling league, and may retrieve traffic and/or hazard information from a data source (e.g., a third-party mapping or real-time API). The application may determine that the main interstate highway that the user travels on to reach the bowling league is congested (e.g., by heavy traffic due to an accident). In response to the real-time traffic information, safe routing 136 may notify the user of the traffic routing issue by, for example, sending a notification (e.g., an email or push notification) to the user's mobile device. In another embodiment, the application may suggest a time by which the user may need to depart to reach the bowling league on time.

As noted, the outputs of the mobility profile module 120 may enable the user to attain a more healthy and/or responsible lifestyle. The examples given are simplified for illustration purposes. Nonetheless, it should be appreciated that a user who is provided with opportunities to improve their diet, activity levels, and driving behavior may be a lower-risk user overall. Even a user who does not follow the guidance or suggestions generated a result of analyzing that user's mobility profile may be made more consciously aware of the decisions the user is making by being regularly notified of potential risks, based on the user's activities. A user who takes mitigating action may be rewarded.

Risk mitigation 138 may be a mapping generated by mobility profile module 120, and may be based on other outputs and mappings of mobility profile module 120. Risk mitigation 138 may be calculated by quantifying and comparing mapping output(s) over time. For example, a first user risk profile 134 may be determined at a point in time using the techniques described above. A user may be provided with a plurality of smart suggestions 130 for improving their behavior which may include a first set of respective risk-improvement categories. At a later time, a second user risk profile 134 may be generated, and a second set of respective risk-improvement categories identified. The first set of respective risk-improvement categories may be compared to the second set of respective risk-improvement categories to generate a set of risk-improvement deltas. The risk-improvement deltas may be a measure of how well the user has mitigated risk over time, and may correspond to risk mitigation 138. A user who has successfully mitigated risk in a category brought to the user's attention may be rewarded (e.g., by being awarded a discount, offer of a product/service, or in another way). The above-described risk comparison may include, or be performed with respect to, multiple risks facing a user, which are identified by analyzing inputs to mobility profile module 120.

As noted, a well-rounded understanding of each user may help create a rating to help with assessment of risk. In addition, the data collected may be of interest to third parties who seek to better tailor their products and services to meet the needs of customers. New sources of revenue may be developed through data sharing agreements with third parties, subject to user opt-in. A subset of the most relevant data may be provided to such third parties, and the data may be anonymized prior to any sharing.

Figure 2:
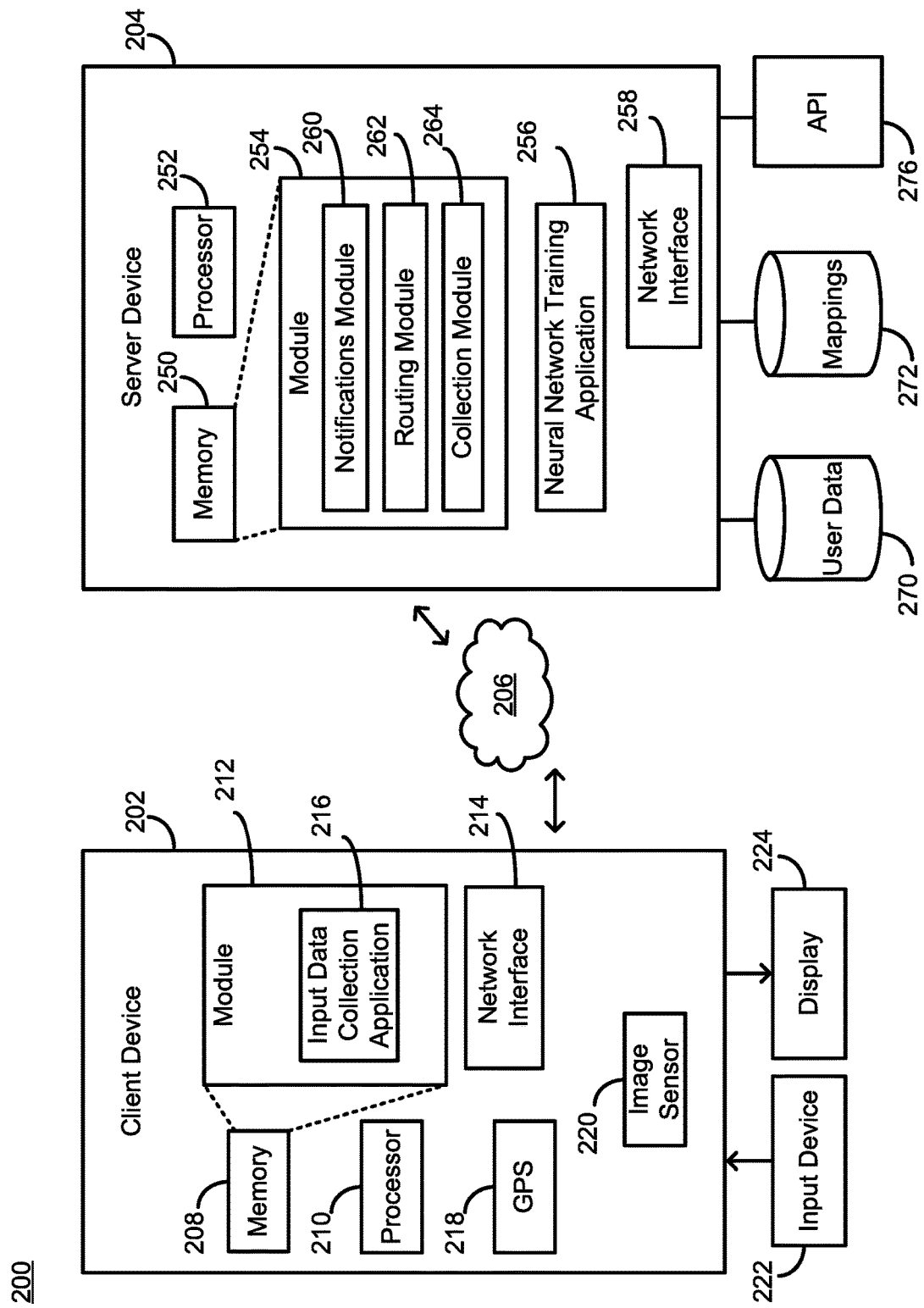
FIG. 2 depicts an example environment for training and/or creating a mobility profile, and remotely accessing that profile, according to an embodiment.

With respect to FIG. 2, an environment 200 is depicted in which neural network and data analytics models may be trained and/or created, and remotely accessed by a user. FIG. 2 may include a client device 202, a server device 204, and a network 206. For the sake of simplicity, client device 202 may be referred to as client 202 and server device 204 may be referred to as server 204. However, it should be appreciated that any number of client devices and/or server devices may be deployed to achieve the aims of the methods and systems described herein. Client 202 may communicate with server 204, and vice versa, via network 206. Network 206 may include one or more suitable wireless networks, such as a 3G or 4G network, a WiFi network or other wireless local area network (WLAN), a satellite communication network, and/or a terrestrial microwave network, for example. In some embodiments, network 206 may include one or more wired networks, such as Ethernet.

Client 202 may be any suitable computing device (e.g., a mobile device such as a smart phone, tablet, laptop computer, wearable device, etc.). Client 202 may include a memory 208 and processor 210 which may, respectively, store and execute computer instructions. Memory 208 may comprise one or more memories of one or more types (e.g., persistent memory, solid state memory, random access memory (RAM), etc.), and may include a module 212, which may include a data collection and monitoring application 214, in addition to other application(s). While referred to in the singular, CPU 210 may include any suitable number of processors of one or more types (e.g., one or more CPUs, graphics processing units (GPUs), cores, etc.). Data collection and monitoring application 214 may be a web and/or mobile application which and may be distributed to, or used by, client 202 via any suitable means. For example, client 202 may be a personal device of a user, and data collection and monitoring application 214 may be downloaded (e.g., gratis or for a fee) from an application store (e.g., a store associated with the vendor of the user device embodying client 202).

In an embodiment, client 202 may be a laptop and data collection and monitoring application 214 may be an installable application downloaded from a server (e.g., an HTTP or FTP server) of a vendor, such as server 204. Data collection and monitoring application 214 may be capable of collecting user data, and may perform other functions (e.g., handing requests and responses between client 202 and server 204, redirecting the user to other applications, etc.). User data may correspond to location data 104, consumer history 106, internet use 108, and mobile accounts and applications 110. However, in some embodiments, some user data may be collected from client 202 and other user data may originate elsewhere. For example, as noted, some data may be pre-existing data (e.g. traditional data 102) or data that is retrieved from a third-party source, such as a consumer credit reporting bureau. Data collection and monitoring application 214 may contain instructions for monitoring incoming and outgoing Internet traffic to and from client 202, as well as instructions for interrogating other applications in memory 208 for data. To the extent location and/or movement data is collected by client 202, the location and movement data may be collected from, respectively, GPS 218 and gyroscope 220. Client 202 may include input device 222 and display 224. In some embodiments, input device 222 and display 224 may be integrated into a single hardware device, such as a touchscreen. In other embodiments, input device 222 and display 224 may be, respectively, a hardware peripheral device (e.g., keyboard, mouse, etc.) and a computer video display. Data that is collected by data collection and monitoring application 216 may be transferred to server 204 via network 206, and network interface 214.

Server 204 may include memory 250 and processor 252, which may have similar respective capabilities as memory 208 and processor 210. Server 204 may include module 254, which may be embodied as computer-readable instructions installed in memory 250. Module 254 may comprise any number of modules for analyzing input (e.g., traditional data 102) and producing output (e.g., safe routing 136). The respective modules comprising module 254 may generate (e.g., train) mappings and/or models, which may be saved for later use. Mappings may be trained neural network, data analytics, or other models. Server 204 may include neural network training application 256 and network interface 258, which may communicate with one or more client devices, such as client device 204, via network 206. Network interface 258 may also be used, in some embodiments, to communicate with electronic databases that are communicatively coupled to server 204, such as user data 270 and mappings 272, and with communicatively coupled services (e.g., API 276).

Neural network training application 256 may create mappings (e.g., an artificial neural network model) by analyzing input (e.g., data from user data 270 and/or client device 202). Mappings may be saved in an electronic database such as mappings 272 and may include layers of neurons, including input layers, one or more hidden layers, and one or more output layer. Each layer comprising the mapping may include any number of neurons. In an embodiment, a mapping may have any number of hidden layers. It should be understood that mappings may be neural network models or other structures, and that the respective configurations may differ. One or more mappings may be defined for each category of input. For example, one or more mapping (e.g., one or more neural networks) may be created for each of traditional data 102, location data 104, consumer history 106, etc. Module 254 may contain a fixed number of "slots" in which additional mappings may be inserted, or may allow any number of additional mappings to be added. An input layer of a neural network may receive different input data corresponding to the type of input. For example, each input neuron in a neural network input layer associated with internet use 108 may accept a parameter corresponding to an aspect of internet use user data (e.g., the title or URL of a website composing internet use 108).

Each parameter of a neural network may be associated with a weight that is set during the training of the neural network and is applied during operation of the neural network. The weights may be initialized to random values and adjusted automatically as part of the training process. The weights may also, or alternately, be adjusted manually by an operator of the neural network mapping. Input layers may comprise thousands or more inputs. In some embodiments, the number of elements used by neural networks may change during the training process, and some neurons may be bypassed or ignored if, for example, during execution of the neural network, they are determined to be of less relevance. Each neuron in hidden layer(s) of the neural network mappings may process one or more inputs from input layers, and/or one or more outputs from a previous one of the hidden layers, to generate a decision or other output. Output layers may include one or more outputs each indicating a confidence factor or other indication describing one or more inputs. A claim risk level output may represent the likelihood, probability, or confidence that a user associated with a mapping (e.g., the user of client device 202) may represent an insurance risk. In some embodiments, outputs of neural networks may be obtained from a hidden layer in addition to, or in place of, output(s) from output layers. In some embodiments, each layer may have a discrete, recognizable, function with respect to input data. For example, if n=3, a first layer may analyze one dimension of inputs, a second layer a second dimension, and the final layer a third dimension of the inputs, where all dimensions are analyzing a distinct and unrelated aspect of the input data. For example, the dimensions may correspond to aspects of an image considered strongly determinative, then those that are considered of intermediate importance, and finally those that are of less relevance. In other embodiments, the layers may not be clearly delineated in terms of the functionality they respectively perform. For example, two or more of hidden layers may share decisions relating to mapping outputs, with no single layer making an independent decision. In other embodiments, two or more hidden layers may have a cancellation effect, wherein the layers offset confidence in equal measure. In some embodiments, neural networks may be constituted by a recurrent neural network, wherein the calculation performed at each neuron is dependent upon a previous calculation. It should be appreciated that recurrent neural networks may be more useful in performing certain tasks, such as extracting text from images. Therefore, in an embodiment, a recurrent neural network may be trained with respect to a specific piece of functionality. For example, in an embodiment, a recurrent neural network may be trained and utilized to extract text from images.

A processor (e.g., processor 250) may train a mapping (e.g., a machine learning model) using supervised or unsupervised machine learning techniques, and the machine learning model may employ a neural network, which may be a convolutional neural network, recurrent neural network, deep learning neural network, or a hybrid module that learns according to a plurality of techniques from one or more fields of learning. Mappings may be contained within objects that contain other information, in some embodiments. Such containment may help to preserve an association between a given neural network model and data used to train and/or identify the mapping. Mappings may be created based upon test inputs of data to make valid and reliable predictions for novel inputs. Machine learning may be used to determine a risk level, which may indicate the likelihood that a user represents a certain type of risk. Accuracy of neural networks may be measured by cross validating models using a known validation data set. After each model has been trained, the validation data set can be used to calculate classification accuracy and/or error.

As noted, module 254 may include numerous modules, such as notifications module 260, routing module 262, and collection module 264. It should be appreciated that additional specialized modules may be added to module 254 as new types of user input data are identified. Each module 254 may contain separate instructions for ingesting input data.

Notifications module 260 may be used for generating, transmitting, and handling responses to notifications. Notifications are discussed further with respect to FIG. 4a. Routing module 262 may be responsible for analyzing user input (e.g., user data 270 and/or data received from an API) and creating route mappings. Server 204 may further include collection module 264, which may be responsible for collecting and cataloguing data pertaining to users provided by client devices such as client device 202, as well as data from other sources. Collection module 264 may contain instructions for retrieving user information in parallel, and/or according to a pre-set schedule.

In operation, a user may open an application (e.g., input data collection application 216), or an application may be launched by processor 210 in response to a timer or other event. The application may be provided to the user by the proprietor of server device 204. The user may be prompted to grant consent to allow the application certain permission (e.g., location or other data), and based on the user's opting-in, the application may transmit an indication of user consent to server 204. The indication of user consent may be permanently stored in association with the user in user data 270, unless the user later revokes the consent. Server 204 may then begin loading (e.g. in a separate thread or process) data related to the user. For example, after the user gives consent, traditional data 102 may begin to train a traditional data model in neural network training application 256 using traditional data retrieved from any source. Simultaneously, or at approximately the same time, instructions in input data collection application 216 being executed by processor 210 may begin transmitting, via network interface 214, information gathered by input data collection application 216 in client 202 to server 204. For example, location data 104, internet use 108, and mobility accounts and applications 110 may be transmitted. In yet another parallel or near-parallel process, consumer history data 106 of the user may be requested by collection module 264. If, for example, some user information is not available until a future time, then collection may be deferred (e.g., collection may be scheduled by collection module 264 for later retrieval). In this way, collection module 264 may simultaneously collect data related to a single user from several disparate sources. As each type of data is collected fully (e.g., a consumer credit report is retrieved in its entirety) or a threshold amount of data is collected (e.g., 30 days of the user's internet use history) mobility profile generation may be triggered with respect to each type, or category, of data. Mobility profile generation may include machine learning and data analysis as described above, including the creation and/or use of mappings from input data to output data, and data transmission and collection in client 202 may be based on instructions pre-programmed into input data collection application 216, or upon instructions received in client 202 from server 204.

Collection module 264 may store an indication in mappings 272 which specifies that one or more mapping with respect to a type of input data has been trained. For example, collection module 264 may store a flag indicating that routing module 262 mapping has been completed. This way, a client such as client 202 may programmatically determine whether or not to begin sending data corresponding to a trained mapping. Input data collection application 216 (or another application) may retrieve a list of all completed mappings from server device 204. Once a mapping is marked as complete, then input data collection application 216 may then display to the user an indication that the mapping is complete, and/or may begin using the mapping to provide the user with output information. For example, a user may be traveling near a shopping mall. The fact that the user is traveling near a shopping mall may be determined by client 202 retrieving a user location from GPS 218 and comparing the location to a list of nearby stores. Such a comparison may be performed in server 204, and may involve querying API 276.

Having determined that the user is nearby a shopping area, the client 202 may next determine whether a shopping suggestion mapping has been trained by querying mappings 272 via server 204. A query may be in the form of an HTTP request to an endpoint exposed by server 204. In some embodiments, server 204 may determine whether a mapping corresponds to locations the user is near to by submitting the locations to a trained neural network. If a shopping mapping has been trained, then the user may be presented with smart suggestions when the neural network receives shopping locations as input. The smart suggestions may be generated as notifications by notifications module 260, based on the user location generated by GPS 218 and transmitted to notifications 260 via network interface 214, network 206, and network interface 258. The GPS 218 data may be explicitly requested from GPS 218 to be sent to the server 204 via input data collection application 216.

Prior to a particular mapping being created (e.g., smart suggestion mapping), input data collection application 216 may display an indication to the user that mapping is ongoing, and that suggestions are not yet available. In an embodiment, a mapping created by neural network training application 256 or another module may be transmitted to client device 202 and stored, for example, in memory 208. Such a mapping may be utilized directly by an application to provide a user with information (e.g., suggestions) without the need to transmit further information to server 204.

Once a user receives an output of mobility profile module 120, such as via a notification or message generated in input data collection application 216, user may interact with the output to perform additional tasks. For example, the user may purchase a product or service, find a safer route, or explore the risks that may be affecting them. In some embodiments, smart suggestions 130 may be displayed to the user in a user device by input data collection application 216 (or another application). For example, the user may be provided with a suggestion of a nearby product or service, and may be directed to a web site of the product or service in order to make a purchase. The web site to which the user is redirected may be a third party website or one owned/controlled by the proprietor of the application.

Figure 3:
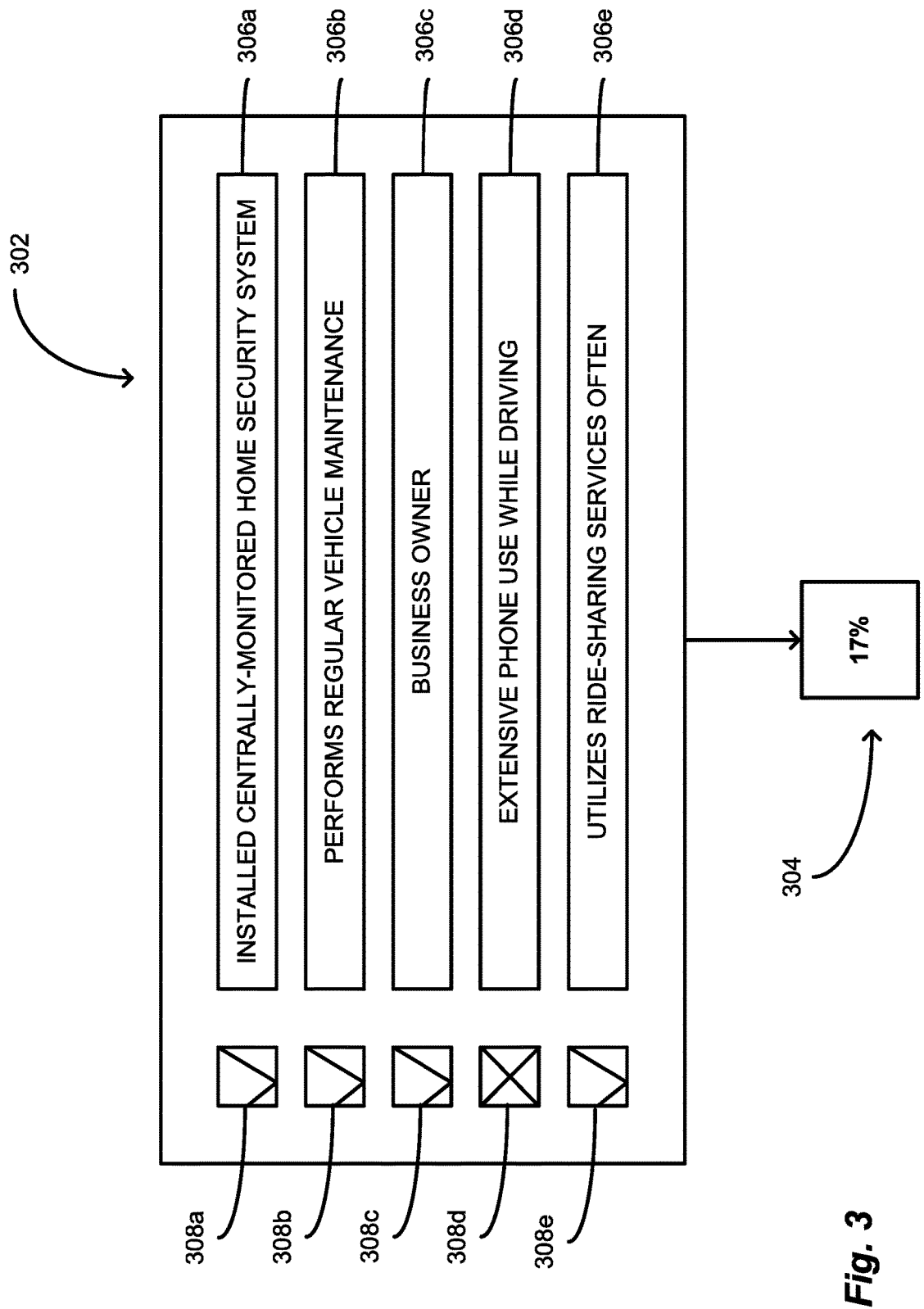
FIG. 3 depicts an example flow diagram of a data analytics model for calculating a risk profile based on a mobility profile, according to an embodiment.

Turning to FIG. 3, an environment 300 including an exemplary flow diagram of an exemplary data analytics model is depicted. Environment 300 may include a risk profile 302 and a risk rating 304. Risk profile 302 may comprise a plurality of risk indicators 306a-306e, each of which is associated with a respective risk state 308a-308e. In an embodiment, the risk state 308a-308e of each risk indicator 306a-306e may be determined by an application. In an embodiment, the values of the respective risk indicators 306a-306e may be set manually (e.g., by a human operator). Although risk states 308a-308e are depicted as binary checkboxes, they may also comprise other values (e.g., numeric or textual values). Once one or more respective risk state 308a-308e of the risk indicators 306a-306e are determined, the risk indicators 306a-306e may be analyzed to determine risk rating 304. Each risk indicator 306a-306e may be associated with a respective risk weight. The weighting of each respective risk indicator 306a-306e may be determined according to whether or not the risk is present (e.g., whether a box is checked or not) or according to another metric. For example, the magnitude of the respective number in a risk state 308a-308e may determine the weight a risk is assigned. For example, a person who performs vehicle maintenance 10% of the time may be weighted as a correspondingly higher risk than a person who performs vehicle maintenance 95% of the time. It should be understood that the risk indicators 306a-306e are merely simplified examples for expository purposes, and that many other risk indicators are envisioned. Risk rating 304 is depicted as a percentage, but may also be output in any other suitable format (e.g., as a binary or numeric value) and according to any suitable risk calculation. Each respective risk weight may be based on factors pertaining to the individual user. For example, a person's age may determine the level of risk assigned to the risk indicator of 306a. The data analytics model described with regard to FIG. 3 may correspond to mobility profile module 120, in some embodiments.

Figure 4A:
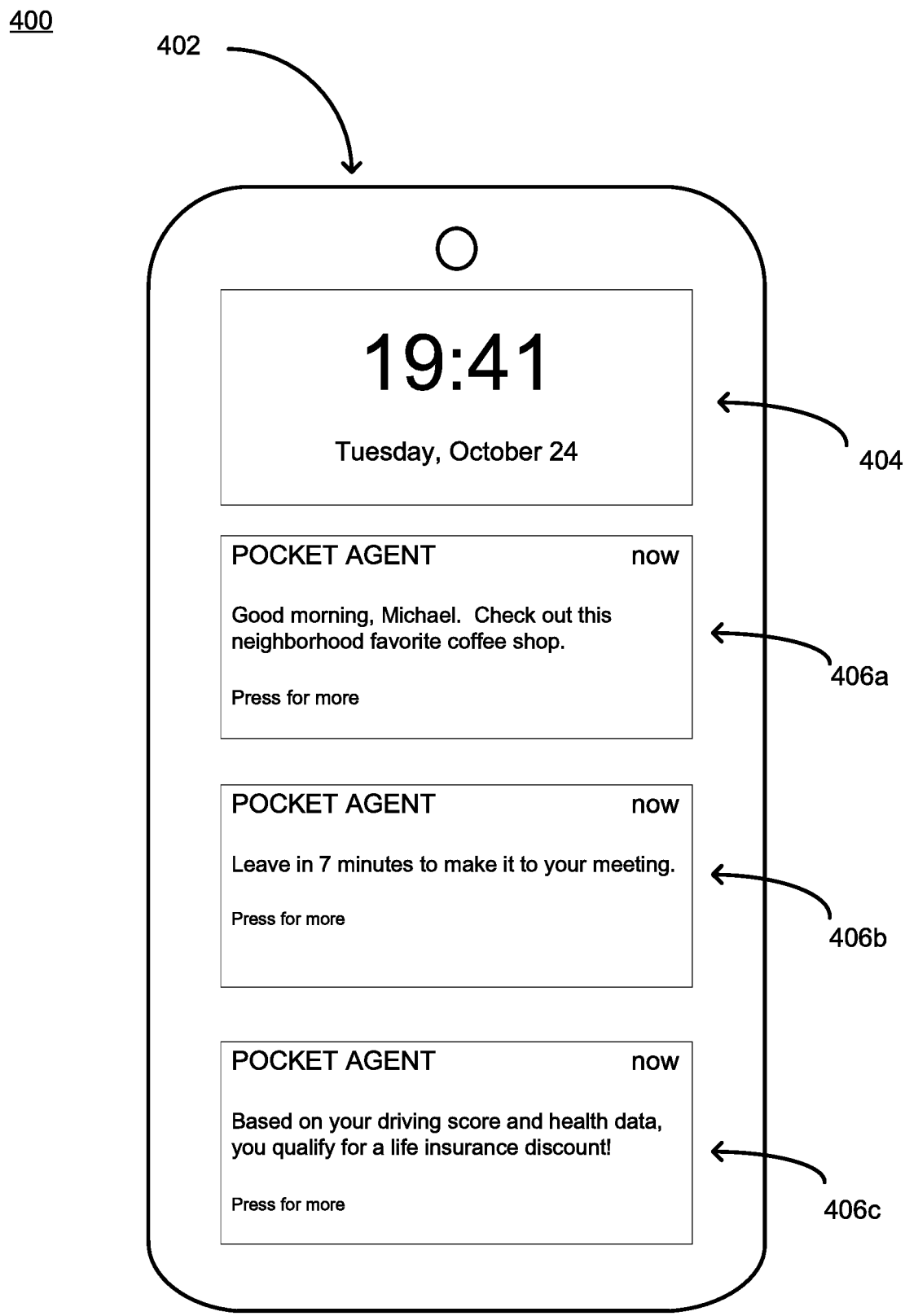
FIG. 4a depicts an example user interface for displaying notifications, according to one embodiment.

With regard to FIG. 4a, an environment 400 including an example user interface 402 for displaying notifications 406a-406c to a user in a user device, according to an embodiment, is depicted. User interface 402 may include a date/time indication 404. User interface 402 may be displayed in a user device display, such as display 224. In an embodiment, notifications 406a-406c may be generated by notifications module 260. Notifications module 260 may generate notifications in real-time, or via a batch process that runs periodically (e.g., once every five minutes). Notifications may be transmitted to users via any suitable means, including without limitation, SMS messages, email, push notifications, etc. Notifications may include a payload, which a user may interact with (e.g., a hyperlink to a website or application, and/or other data).

Notification 406a may be a smart suggestion that is based on the user's consumer history 106, such as an indication that the user often purchases coffee in the evening. The smart suggestion 406a may correspond to one of smart suggestions 130, and may be based on the user's location data 104, consumer history 106 (e.g., a recent web search of the user) and/or mobility accounts and applications 110 data (e.g., an indication that the user is searching for coffee in another application in the user's device). Notification 406a may be based on an ambient similarity score, such as ambient similarity score 132 by, for example, locating the user based on location data 104, comparing the user to other users in the geographic region that the user is located in, determining the other users' respective locations and/or recent purchases, and comparing them to that of the user.

Notification 406b may correspond to safe routing 136. As discussed above, a mobility profile module such as mobility profile module 120 may continuously or periodically receive information from a user, such as via user data 270, which may be used to train and/or operate a neural network model. A routing module, such as routing module 262, may analyze the user's location (e.g., via location data 104), and the user's location history over a period of time. To continue the bowling league example, a user who typically attends a bowling league on Tuesday evenings at 20:00 may require 12 minutes to drive to the league. Therefore, at 19:14 on Monday, as depicted in time/date indication 404, routing module 262 may determine that a user should leave by 19:48 to arrive on time, and may cause notification module 260 to generate notification 406b at 19:41, advising the user to leave in seven minutes to arrive at the bowling league on time. It should be appreciated that routing module 262 may create additional and alternate mappings by analyzing mobility profile module inputs, and that notification module 260 may generate notifications based on any suitable criteria.

Notification 406c may correspond to risk profile 134, risk mitigation 138, and/or risk profile 302. For example, notification 406c may be generated by analyzing traditional data 102 input in a mapping or model, such as a neural network, to determine an individual's medical/health risk. Such risk may be included in risk profile 134. At a first time, the health risk in risk profile 134 may be determined to be of a first risk rating as describe above with respect to risk rating 304. However, a smart suggestion 130 may be provided to the user, and if the user modifies their behavior, a second risk profile 134 including a second risk rating 304 may be generated. By comparing the first and second risk ratings, the methods and systems herein may determine a risk mitigation 138. If the risk mitigation 138 is an improvement, such as a reduction in risk beyond a set rating, then a notification such as 406c may be generated. Generation of the notification 406c may be based on or conditioned on other information, in some embodiments. For example, any of the inputs to mobility profile 120 (e.g., age of the user, the user's internet use, the user's mobility accounts and applications, etc.) may be analyzed in combination with risk profile 134. It should be appreciated that data sources other than those depicted may be analyzed to determine whether or not to extend an offer notification such as notification 406c to a user. By interacting with notification 406c, a user may be redirected to a web form, mobile application, or other data entry means which may allow the user to purchase a product or service (e.g., an insurance product). Furthermore, interacting with notification 406c may transmit an indication of user interest to server 204, which may be reviewed by the proprietor of the methods and systems herein for other purposes (e.g., to generate sales leads). In an embodiment, notification 406c may be generated by one or more modules included in module 254 analyzing input data from client device 202. For example, collection module 264 may analyze risk indicators 306a-306e along with respective risk states 308a-308e. It should be appreciated that the risk indicators and states are simplified for expository purposes, and that many additional/alternate risk indications and states may be used.

Although FIG. 4a depicts smart suggestions, safe routing, and risk mitigation via notifications in a user interface, it should be appreciated that the information may be presented to the user in any suitable way. In particular, the information may be generated in a client device, such as client 202, and displayed therein without the use of a server device.

Figure 4B:
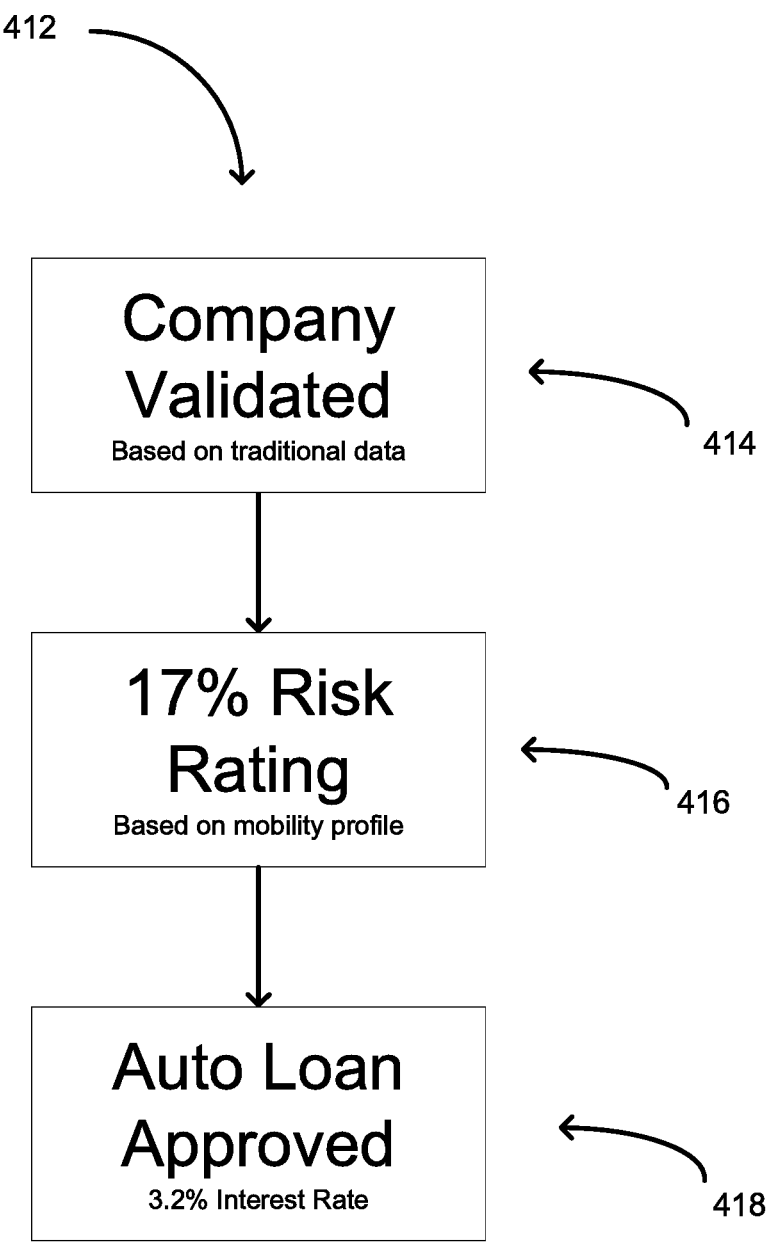
FIG. 4b depicts an example flow diagram for processing a user service request based on a user mobility profile, according to one embodiment.

With regard to FIG. 4b, an environment 410 including an example flow diagram 412 for processing an auto loan based on a user mobility profile, according to an embodiment, is depicted. The flow depicted in FIG. 4b may result from a user of a client such as client 202 interacting with a notification like notification 406c. Upon interacting with the notification 406c by, for example, activating (e.g., by clicking, pressing, or via another user interface event) the notification in the user interface 402, the notification 406c may be caused to open an application that may include one or more user interfaces. The user interfaces may correspond to the process of applying for a vehicle loan, and may allow the user to submit an application for processing. In some embodiments, processing may include a first traditional validation (block 414). Processing may then include a second mobility profiling in which a user risk rating is computed and/or retrieved (block 416). The risk rating may correspond to risk rating 304. The validation based on traditional data and mobility profile risk ratings may be synthesized to form an approval decision and loan terms (block 418). The use of a risk rating in addition to traditional loan criteria may allow for more accurate and fair loan terms to be provided to users.

Figure 4C:
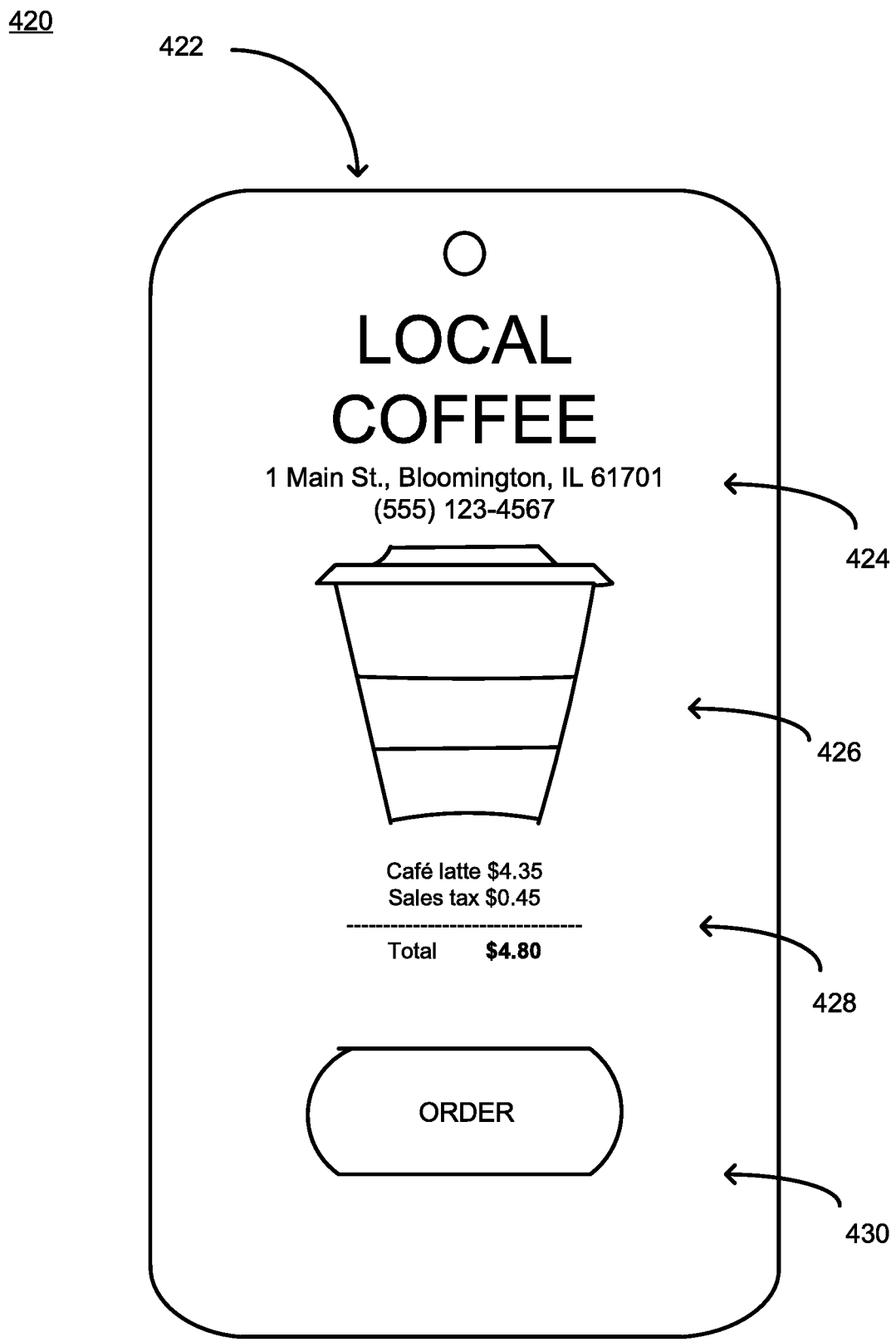
FIG. 4c depicts an example user interface for processing a user local purchase, according to one embodiment.

Turning to FIG. 4c, an example environment 420 including an example user interface 422 for processing a user local purchase based on a mobility profile notification is depicted, according to a particular embodiment. Environment 420 may include business identification information 424, product identification 426, and invoice information 428. Environment 420 may include one or more user interface components 430 (e.g., an order or submit button). It should be appreciated that user interface 422 may allow a user to make one or more product selections, and that any product or service may be offered (e.g., insurance-related products). User interface 422 may be an application provided to a user device such as client 202, or a web interface served to a user device via HTTP (e.g., via server 204). User interface 422 may be displayed to user 202 based on the user's activation of a notification, such as notification 406a. In this way, the methods and systems herein facilitate the purchase of local products and services based on a user's location, and the user's preferences. For example, a user may be show coffee shops if and only if the user has searched for coffee-related subjects, or previously purchased coffee, as respectively (or jointly) determined by analysis of consumer history 106 and internet use 108. User interface 422 may be a user interface of a third-party mobile application (e.g., an ordering application). A user may be referred to such a third-party mobile application by, for example, a module in module 254 analyzing mobility accounts and applications 110 to determine whether the user has installed an application that supports ordering a particular product (e.g., life insurance, coffee, or another product/service).

Figure 5:
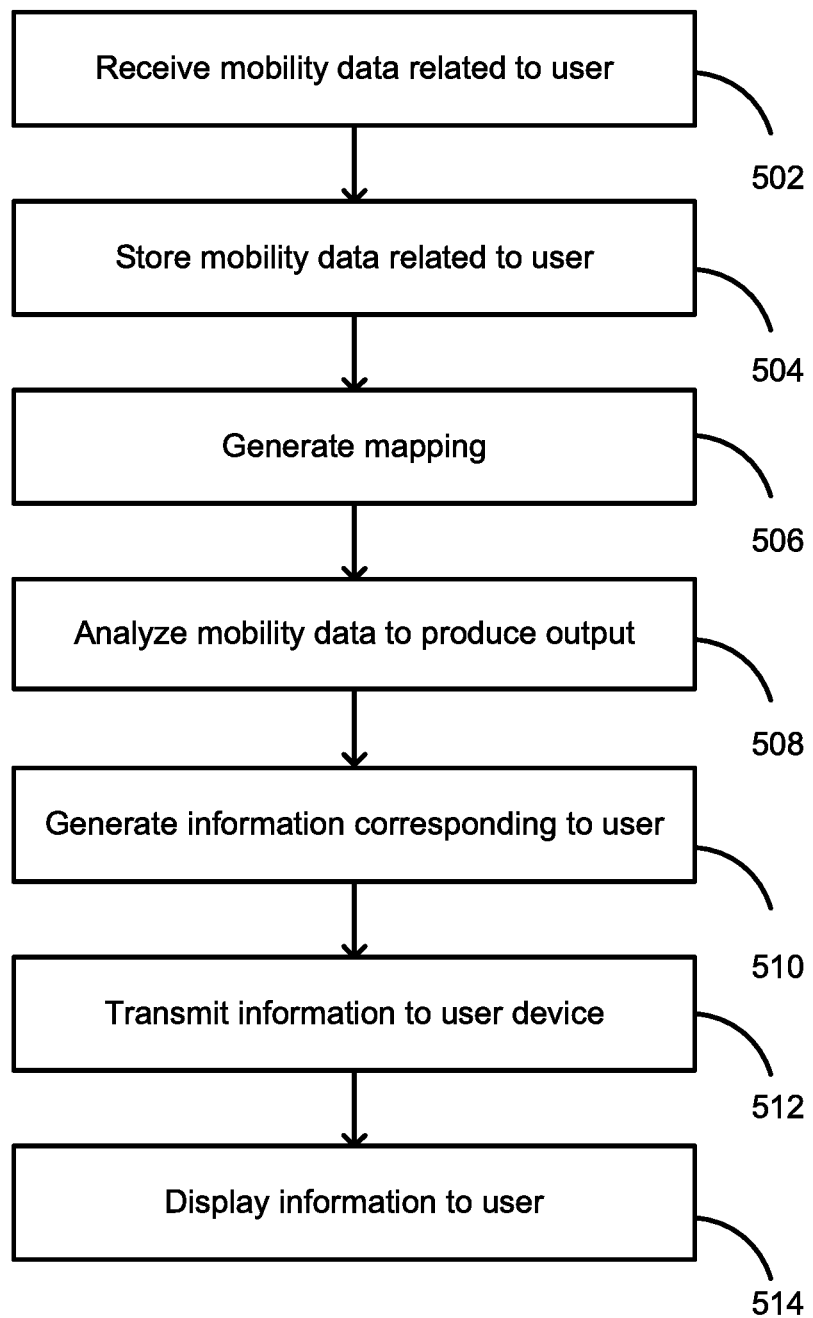
FIG. 5 depicts an exemplary flow diagram of a method for generating a user mobility profile, according to one embodiment.

With regard to FIG. 5, an exemplary flow diagram of a method 500 of generating a user mobility profile is depicted, according to an embodiment. The method 500 may include receiving, in a remote computing device (e.g., server 204), mobility data related to a user from a client device, such as client 202, or from another source, such as API 276, which may be a third-party API or an in-house API (e.g., a repository of consumer information held by the proprietor of a system implementing method 500) (block 502). Mobility data may include any type of data that a user has consented to share with an organization, including traditional and non-traditional data as discussed above. The method 500 may include storing the mobility data related to the user, for example; in an electronic database (e.g., a relational or key/value data store) (block 504). The mobility data related to the user may be stored in association with the user, so that it may be later retrieved using the user as a uniquely-identifying key (e.g., by a user identification associated with the user, such as a username). The method 500 may further include generating a mapping wherein the mapping is configured to analyze a portion of the mobility data, and wherein the mapping is configured to produce an output corresponding to the portion (block 506). The mapping may be a trained neural network or other data analytics model (e.g., a Bayesian model). A different type of model may be trained with respect to each different type of mobility data collected, as described above. For example, a neural network model may be trained to analyze consumer history 106 and a Bayesian model trained to analyze internet use history 108. Mobility data in block 506 may include multiple types of heterogeneous mobility data transferred to the remote device via a network such as network 206. For example, multiple portions of mobility data may be received in a single module, such as mobility profile module 120, unpacked from a single data structure, and processed individually. Different models may then be trained with respect to each portion of the mobility data. The method 500 may include analyzing, using the mapping, one or more portion of the mobility data to produce an output corresponding to the one or more portion of the mobility data (block 508). For example, location data 104 may be analyzed, as discussed above, in addition to internet use 108. As discussed above, both location data 104 and internet 108 use may be analyzed together to produce an output. The output may be numeric or non-numeric. For example, depending on the mapping, the output may be in the form of a list, a score, a profile, a route between two points, a profile, or another form. A mapping may, for example, accept a number of risk parameters (e.g., risk indications 306a-306e and risk states 308a-308e) and comprise instructions for computing a risk profile 304 based on the risk indications, including by associating a weighting with each of the respective risk parameters.

The method 500 may include generating, based on the output corresponding to the portion of the mobility data, information corresponding to the user (block 510). Information corresponding to the user may include any relevant information, including a smart recommendation, a notification, a risk profile, claim mitigation, route information, loan approval, etc. The method 500 may include transmitting the information corresponding to the user to a device of the user (512). For example, a server such as server 204 may format the information in a response. The response may be any suitable response, such as an HTTP response, an SMS message, a push notification, etc. The response transmitted may include the information corresponding to the user in any suitable format (e.g., as hypertext, included as an executable object in an application, etc.). The method may include displaying, in a display of the user device (e.g., display 224), the information corresponding to the user (block 514). For example, an application in client (e.g., an application executing in module 212) may receive the information corresponding to the user via network 206, and processor 210 may execute instructions contained in the information corresponding to the user, and/or may display the information in a display (e.g., display 224).

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart vehicle controller, or other smart devices). Of course, deployment and use of neural network models at a user device (e.g., the client 202 of FIG. 2) may have the benefit of removing any concerns of privacy or anonymity, by removing the need to send any personal or private data to a remote server (e.g., the server 204 of FIG. 2). In such instances, there may be no need for affirmative consent to be collected.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for a system and method for generating consumer mobility profiles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of generating a user mobility profile using a machine learning model, the computer-implemented method comprising:
   receiving, in a remote computing device, mobility data associated with the user;
   storing, in an electronic database, the mobility data associated with the user;

generating a mapping corresponding to the machine learning model,
    wherein the generated mapping is configured to analyze a portion of the mobility data, and
    wherein the generated mapping is configured to produce an output corresponding to the portion of the mobility data;
analyzing, using the generated mapping, one or more portions of the mobility data to produce an output corresponding to the one or more portions of the mobility data;
generating, based on the output corresponding to the one or more portions of the mobility data, information corresponding to the user;
transmitting the generated information corresponding to the user to a display device of the user; and
displaying, in the display device, the generated information corresponding to the user.

2. The method of claim 1, wherein said displaying the generated information corresponding to the user includes displaying a notification including one or both of (i) a smart recommendation, and (ii) a safe route.

3. The method of claim 1, wherein analyzing, using the generated mapping, the one or more portions of the mobility data to producing the output corresponding to the one or more portions of the mobility data includes analyzing both traditional data and non-traditional data.

4. The method of claim 1, wherein receiving the mobility data associated with the user includes receiving one or both of (i) location data corresponding to the user, and (ii) consumer history data corresponding to the user.

5. The method of claim 4 wherein the consumer history data corresponding to the user is retrieved from a third-party credit reporting bureau.

6. The method of claim 1, wherein receiving the mobility data associated with the user includes receiving one or both of (i) internet use data, and (ii) mobility accounts and applications data.

7. The method of claim 1, wherein generating the mapping comprises training a neural network, wherein the neural network comprises a plurality of input neurons configured to accept, respectively, the one or more portions of the mobility data, and to generate, based on the one or more portions of the mobility data, one or more outputs.

8. The method of claim 7, wherein the one or more outputs correspond to one or both of (i) a risk profile, and (ii) an ambient similarity score.

9. The method of claim 8, wherein the mobility data is first mobility data and the risk profile is a first risk profile, further comprising:
    repeating the method using a second mobility data as input to obtain a second risk profile,
    comparing the first risk profile and the second risk profile to determine a risk mitigation, and
    transmitting, based on the risk mitigation, a reward to the user.

10. The method of claim 8, further comprising:
    identifying, based on the ambient similarity score, a set of similar users wherein each respective one of the set of similar users is associated with a respective ambient similarity score;
    generating, by analyzing at least the set of similar users, a smart suggestion, and
    transmitting, to the user, the smart suggestion.

11. A computing system comprising:
    one or more processors; and
    one or more memories storing instructions that, when executed by the one or more processors, cause the computing system to:
    receive, in a remote computing device, mobility data associated with the user;
    store, in an electronic database, the mobility data associated with the user;
    generate a mapping corresponding to a machine learning model,
        wherein the generated mapping is configured to analyze a portion of the mobility data, and
        wherein the generated mapping is configured to produce an output corresponding to the portion of the mobility data;
    analyze, using the generated mapping, one or more portions of the mobility data to produce an output corresponding to the one or more portions of the mobility data;
    generate, based on the output corresponding to the one or more portion of the mobility data, information corresponding to the user;
    transmit the information corresponding to the user to a display device of the user; and
    display, in the display device, the generated information corresponding to the user.

12. The system of claim 11, wherein the information corresponding to the user includes one or both of (i) a smart recommendation, and (ii) a safe route.

13. The system of claim 11, wherein the instructions further cause the one or more processor to analyze both traditional data and non-traditional data.

14. The system of claim 11, wherein the instructions further cause the one or more processors to receive one or both of (i) location data corresponding to the user, and (ii) consumer history data corresponding to the user.

15. The system of claim 14, wherein the consumer history data includes data from a third party credit reporting bureau.

16. The system of claim 11, wherein the instructions further cause the one or more processors to receive one or both of (i) internet use data, and (ii) mobility accounts and applications data.

17. The system of claim 11, wherein the instructions further cause the one or more processors to:
    train a neural network, wherein the neural network comprises a plurality of input neurons configured to accept, respectively, the one or more portions of the mobility data, and
    generate, based on the one or more portions of the mobility data, one or more outputs.

18. The system of claim 11, wherein one or more outputs correspond to one or both of (i) a risk profile, and (ii) an ambient similarity score; and the instructions further cause the one or more processors to:
    identify, based on the ambient similarity score, a set of similar users wherein each respective one of the set of similar users is associated with a respective ambient similarity score,
    generate, by analyzing at least the set of similar users, a smart suggestion, and
    transmit, to the user, the smart suggestion.

19. The system of claim 18, wherein the mobility data is first mobility data and the risk profile is a first risk profile, and the instructions further cause the one or more processors to:
    repeat the method using a second mobility data as input to obtain a second risk profile, compare the first risk profile and the second risk profile to determine a risk mitigation, and transmit, based on the risk mitigation, a reward to the user.

20. A non-transitory computer readable medium containing program instructions that when executed, cause a computer to:

receive, in a remote computing device, mobility data associated with the user;

store, in an electronic database, the mobility data associated with the user;

generate a mapping corresponding to a machine learning model,
  wherein the generated mapping is configured to analyze a portion of the mobility data, and
  wherein the generated mapping is configured to produce an output corresponding to the portion of the mobility data;

analyze, using the generated mapping, one or more portions of the mobility data to produce an output corresponding to the one or more portions of the mobility data;

generate, based on the output corresponding to the one or more portions of the mobility data, information corresponding to the user;

transmit the information corresponding to the user to a display device of the user; and display, in the display device, the generated information corresponding to the user.

* * * * *